Sept. 27, 1949.  D. R. MARTIN  2,483,289
REFLECTED VIEW MIRROR FOR AUTOMOTIVE VEHICLES
Filed April 15, 1947  2 Sheets-Sheet 1

INVENTOR.
Dorian R. Martin
BY William Cleland
Attorney

Sept. 27, 1949.         D. R. MARTIN         2,483,289
REFLECTED VIEW MIRROR FOR AUTOMOTIVE VEHICLES
Filed April 15, 1947         2 Sheets-Sheet 2
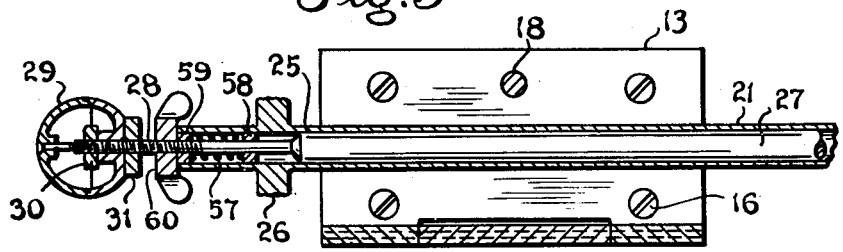
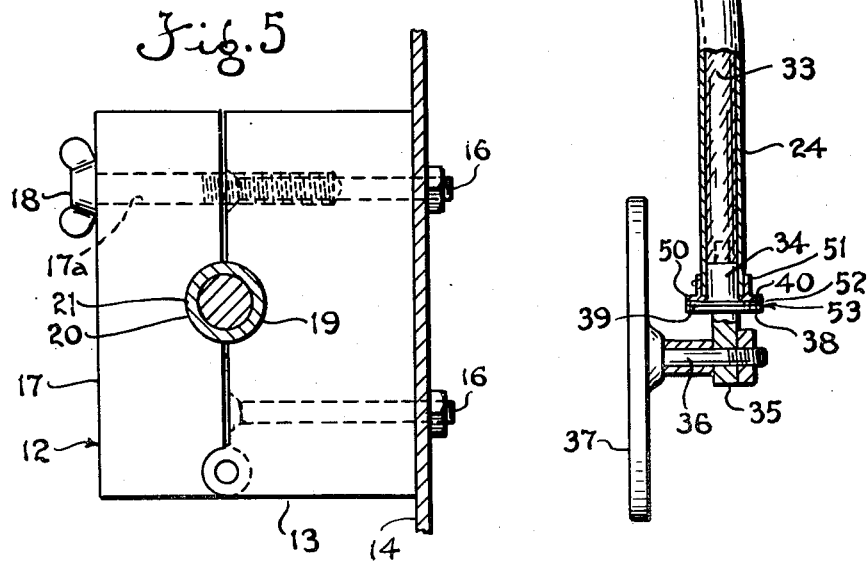
INVENTOR.
Dorian R. Martin
BY William Cleland
Attorney Patented Sept. 27, 1949

2,483,289

UNITED STATES PATENT OFFICE 2,483,289

REFLECTED VIEW MIRROR FOR AUTOMOTIVE VEHICLES

Dorian R. Martin, Cleveland, Ohio

Application April 15, 1947, Serial No. 741,601

5 Claims. (Cl. 248—205)

This invention relates to a reflected view mirror particularly for automotive vehicles.

In the past rear view mirror devices have been provided for use on trucks or the like, by which limited adjustment of the mirror was possible from the driver's seat. These, however, have been generally objectionable because of an inability to adjust the mirror to eye levels of different drivers of the same vehicle, or to adjust the mirror to enable the driver to view certain remote parts of a vehicle normally obscured from direct view of the driver thereof.

One object of the present invention is to provide a convenient reflected view mirror for vehicles, such as trucks, adapted to be controlled from within the driver's compartment or cab to adjust the mirror at eye levels of different drivers of the same vehicle.

Another object of the invention is to provide a reflected view mirror of the character described which is adapted to be adjusted to a wide range of fixed angular positions, for viewing a maximum number of areas of a vehicle normally hidden from the view of the driver, and including areas forwardly, rearwardly, above, or below the driver's eye level.

Another object of the invention is to provide a device of the character described, including improved means for readily mounting the same in the driver's compartment of a vehicle, and in a position which will not in any way obstruct the driver's vision through the windshield or otherwise interfere with proper operation of the vehicle.

Other objects of the invention will be manifest from the following brief description and the accompanying drawings.

Of the accompanying drawings:

Figure 3 is a further enlarged detail cross-section, taken substantially on the line 3—3 of Figure 2.

Figure 4 is a detail cross-sectional view, on the same scale as Figure 3, and taken substantially on the line 4—4 of Figure 2.

Figure 5 is an enlarged vertical cross-section, taken substantially on the line 5—5 of Figure 1.

Figure 1:
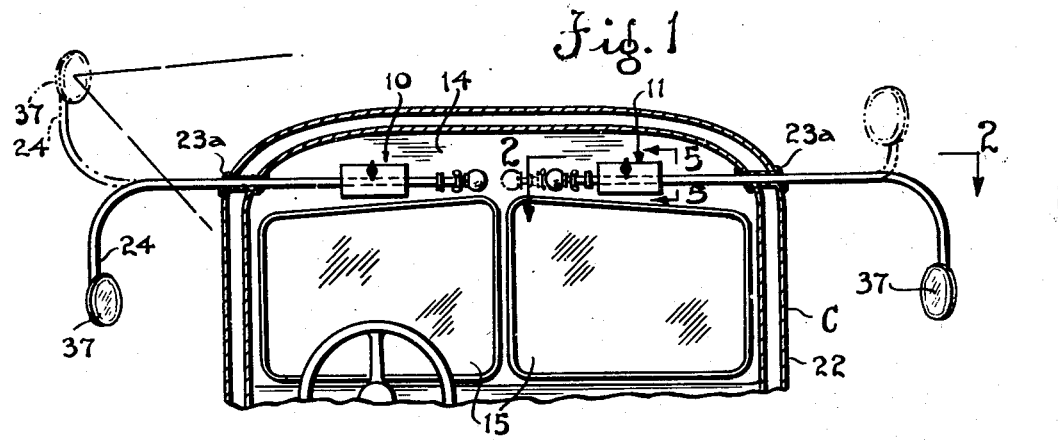
Figure 1 is a vertical cross-section of the upper portion of the driving compartment of a truck, illustrating two reflected view mirror units embodying the features of the invention.

With particular reference to Figure 1 of the drawings, there is illustrated an interior view of the driver's compartment or cab C of a truck, wherein is mounted oppositely disposed reflected view mirror units 10 and 11, embodying the features of the invention. These two devices are identical except that they are utilized for viewing at opposite sides of the vehicle, but for the purposes of description herein, the right hand device 11 will be described in detail, the like parts of the left hand device otherwise being given like numerals.

Referring to Figures 1 to 5, the numeral 12 designates a support, including a relatively fixed block or plate 13, which may be secured to an inner panel 14 above the front windshield 15 of the driver's compartment C, as by means of suitable bolts 16 having countersunk heads at the inner ends thereof. Hinged at the lower edge of fixed plate 13 may be a clamping plate 17 adapted to be urged inwardly toward plate 13, by means of an adjusting thumb screw 18 slidably received through an aperture 17a in plate 17 adjacent the top thereof and threaded into plate 13. The cooperating inner faces of the plates 13 and 17 have opposite laterally extending grooves 19 and 20 therein for laterally slidably, and rotatably receiving therein an elongated tubular member 21, arranged to extend through the side panel structure 22 of the compartment C to a substantial distance outwardly thereof, as indicated at 23. A suitable rubber or other grommet 23a may be provided through side panel 22 for providing additional support for member 21 and at the same time providing a weather seal between the side panel and said member. The outer extension 23 of member 21 is formed arcuate, to provide a goose-neck extension 23 or arm 24 having a straight end portion at right angles to the longitudinal axis of member 21.

Figure 2:
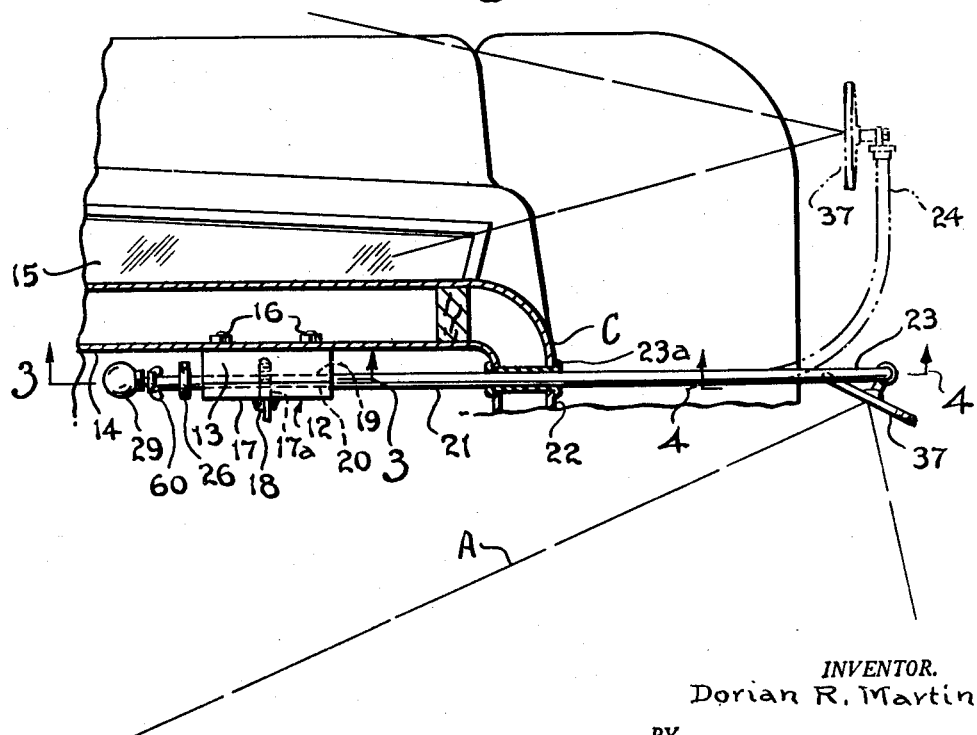
Figure 2 is an enlarged fragmentary cross-section taken substantially on the line 2—2 of Figure 1, and particularly illustrating the right hand mirror unit therein.

Inwardly of support 12 the member 21 has an extension 25 on which is a manually operable knob 26 for rotating the member about its axis, against frictional clamping engagement thereof between the support parts 13 and 17, to present the arm 23 at various angular positions through 360° (see full line positions of the arm in Figures 1, 2 and 3 and the chain-dotted line positions in Figures 1 and 2).

Rotatably received through the straight portion of elongated member 21 may be a shaft or rod 27, having a reduced integral extension 28 projecting from the inner end of the member, the free end of this reduced portion being threaded for reception of a suitable manually operable knob 29 held against relative rotation on the extension by means of lock nuts 30 and 31. By turning the knob 29, the shaft 27 is rotatable within tubular member 21 about the longitudinal axis thereof. Secured to an outer end 32 of shaft 27 may be a flexible cable or element 33 which extends through the goose-neck arm 23 and has fixed to an outer end thereof a head 34 having a lug 35 projecting freely from the end of the arm. That is, when the shaft 27 is rotated, correspondingly to rotate the flexible cable 33, the head 34 will be rotated about said axis at right angles to the longitudinal axis of member 21. A pin 36 is suitably secured through the lug 35 to extend at right angles of said axis of the head 34 and has a mirror 37 mounted at the outer end thereof in substantially spaced relation to said head, the plane of the mirror being in the general direction of said axis at the head and thereby being rotatable therewith through 360°.

The length of arm 23, as an example, may be such that mirror 37 will swing in an arc, the radius of which from the longitudinal axis of member 21 substantially approximates the vertical distance from said axis to a predetermined normal line of vision of the driver through the windshield.

For maintaining the head 34 with the mirror 37 thereon in various adjusted positions of rotation with respect to the axis of rotation of the head, the latter may be provided with an integral collar 38 having an annular shoulder 39 opposed to a corresponding shoulder 40 on a flange 50 of a ring 51 suitably secured to the free end of arm 23, there being a suitable friction disc 52 mounted between the opposed shoulders. This construction constitutes a friction clutch 53 adjustable to provide frictional resistance to rotation of mirror head 34. To this end, a spring 57 may be mounted between a collar 58, surrounding extension 28 and fixed with respect to member 21, and a loose spacer 59 retained at the inner end of member 21, as by a thumb nut 60 threaded on extension 28. The arrangement is such that the thumb nut 60 may be turned on threaded extension 28 to apply requisite frictional pressure on the friction clutch 53, whereby the knob 29 may be turned to adjust the head 34 and mirror 37 thereon to various positions of rotation about the axis of the head.

In the use or operation of the right hand mirror unit 11, described above, the operator or driver by turning the thumb screw 18 may adjust the clamping pressure of clamping plate 17 so that tubular member 21 may be rotated on its axis to any fixed angular position of the arm 23. For normal driving conditions, for example, the operator may turn the knob 26 to adjust the arm 23 to the vertically depending position thereof shown in full lines in Figures 1, 2 and 4, in which position the operator may also, through the knob 29, turn the shaft 27 and flexible cable 33 and thereby set the mirror 37 at a desired fixed angle in a vertical plane providing reflected view from the rear of the vehicle to the eye of the operator, as indicated at A in Figure 2. In a similar manner the operator may adjust the position of the mirror to suit his own eye level, as by swinging the arm 23 upwardly in either direction according to conditions.

As illustrated in chain-dotted lines in Figure 2, the arm 23 may be swung forwardly and the mirror 37 adjusted to a plane by which the operator in the driver's position in compartment C may look through the extreme right portion of the windshield, to view a point directly in front of the vehicle substantially below the bottom of the windshield. This adjustment is highly desirable because certain trucks, such as the cab-over-engine types, have such high fronts that a pedestrian walking in front of the vehicle and in close proximity thereto, may be otherwise completely obscured from the driver's view through the windshield. If necessary, the tubular member 21 may be adjusted longitudinally inwardly with respect to the support 12, as indicated in chain-dotted lines at the right of Figure 1, or in any other angular position of arm 23. The arm 23 may be similarly angularly adjusted to fixed positions within a range of 360° about the axis of tubular member 21, and the mirror may be adjusted to fixed positions within a range of 360° about the angularly disposed axis of the mirror head 34, thereby to present the mirror 37 in many desirable positions, for viewing normally obscured areas of the vehicle. As another example, arm 23 and mirror 37 of the left hand unit 10 is illustrated in chain-dotted lines at the left of Figure 1, in a position whereby the operator may view across or over the top of the vehicle, for the purpose of clearing the highest point of the vehicle with overhead structures. It will be readily seen that the driver of a vehicle equipped with right and left hand mirror units of the type described will be able to manipulate the vehicle past obstacles in a manner which was not previously possible, without frequently leaving the vehicle, or having an assistant to direct the movements of the vehicle.

Modifications of the invention may be resorted to without departing from the spirit thereof or the scope of the appended claims.

What is claimed is:

1. A device adapted for use in mounting a re-reflected view mirror on a vehicle having a front windshield mounted in a forward driving compartment thereof, comprising a hollow elongated member having a longitudinal axis, a support, mounting means on said support for mounting said member to extend laterally in the vehicle compartment above said windshield to be adjustable to selected positions of rotation about the said longitudinal axis, said member having a hollow goose-neck extension to be exteriorly of the compartment and providing an arm at a substantial angle to said longitudinal axis, the free end of said arm thereby being swingable with said member at a substantial radius about said longitudinal axis thereof, a flexible element mounted through said member and goose-neck extension thereof, manually operable means on said member to be interiorly of the vehicle compartment for rotating the member about said longitudinal axis, manually operable means on said element interiorly of the compartment for rotating the element with respect to said member, and means on said rotatable element at the free end of said arm adapted for mounting a mirror thereon to extend with the plane of the mirror on the general direction of the axis of rotation of the free end of the element, whereby the mirror is adapted to be swung in an arc with said arm to various positions of rotational adjustment of the arm about said longitudinal axis and is also rotatable with said element about the axis at the free end thereof in each of said various positions of rotational adjustment of the arm.

2. A device as set forth in claim 1, including tension means for yieldingly retaining said flexible element against rotation relatively of said member.

3. A device as set forth in claim 1, including a friction clutch between said flexible element and said free end of said arm, and adjustable tension means between said flexible element and the inner end of said member operable through the element for adjusting said clutch yieldingly to retain the flexible element against rotation relatively of the member.

4. A device as set forth in claim 1, including a friction clutch between said flexible element and said free end of said arm, and adjustable spring-pressed means between said flexible element and the inner end of said member operable through the element for adjusting said clutch yieldingly to retain the flexible element against rotation relatively of the member.

5. A device adapted for use in mounting a reflected view mirror on a vehicle having a windshield mounted in a forward driving compartment thereof, comprising a hollow elongated member having a longitudinal axis, a support mounting means on said support for slidably mounting said member to extend laterally in the vehicle compartment above the windshield to be adjustable to selected positions of rotation about the said longitudinal axis, said member having a hollow goose-neck extension to be exteriorly of the compartment and providing an arm having the axis at its free end at a substantial angle to said longitudinal axis, the free end of said arm thereby being rotatable with said member about said longitudinal axis thereof, a flexible element mounted through said member and extension arm thereof, means on said member interiorly of said compartment for rotating the member about said longitudinal axis, means on said element to be interiorly of a vehicle compartment for rotating the element with respect to said member, and means on said rotatable element at the free end of said arm adapted for mounting a mirror thereon to extend with the plane of the mirror in the general direction of the axis of rotation of the free end of the element, whereby the mirror is adapted to be swung in an arc with said arm to various positions of rotational adjustment about said longitudinal axis and is also rotatable with said element about the axis at the free end thereof in each of said various positions of rotational adjustment of the arm, the radius of the arc of the swinging movement of said mirror-mounting means with said arm from said longitudinal axis of said member approximating the vertical distance from said longitudinal axis of said member to a normal line of a vehicle driver's vision through the windshield.

DORIAN R. MARTIN.

REFERENCES CITED

The following references are of record in the file of this patent:

UNITED STATES PATENTS

| Number | Name | Date |
| --- | --- | --- |
| 398,289 | Sumner et al. | Feb. 19, 1889 |
| 1,275,974 | Mosher | Aug. 13, 1918 |
| 1,407,897 | Steiner | Feb. 28, 1922 |
| 1,672,900 | Nichols | June 12, 1928 |
| 1,806,773 | Waters | May 26, 1931 |
| 2,136,836 | Bernard | Nov. 15, 1938 |
| 2,179,351 | Right et al. | Nov. 7, 1939 |
| 2,241,866 | Needham | May 13, 1941 |
| 2,290,437 | Kilgore et al. | July 21, 1942 |
| 2,315,260 | Lancaster | Mar. 30, 1943 |
| 2,408,168 | Hofer | Sept. 24, 1946 |